Oct. 15, 1940.          O. MESWARB                2,218,289
                         ANIMAL TRAP
              Filed Jan. 22, 1940          2 Sheets-Sheet 1
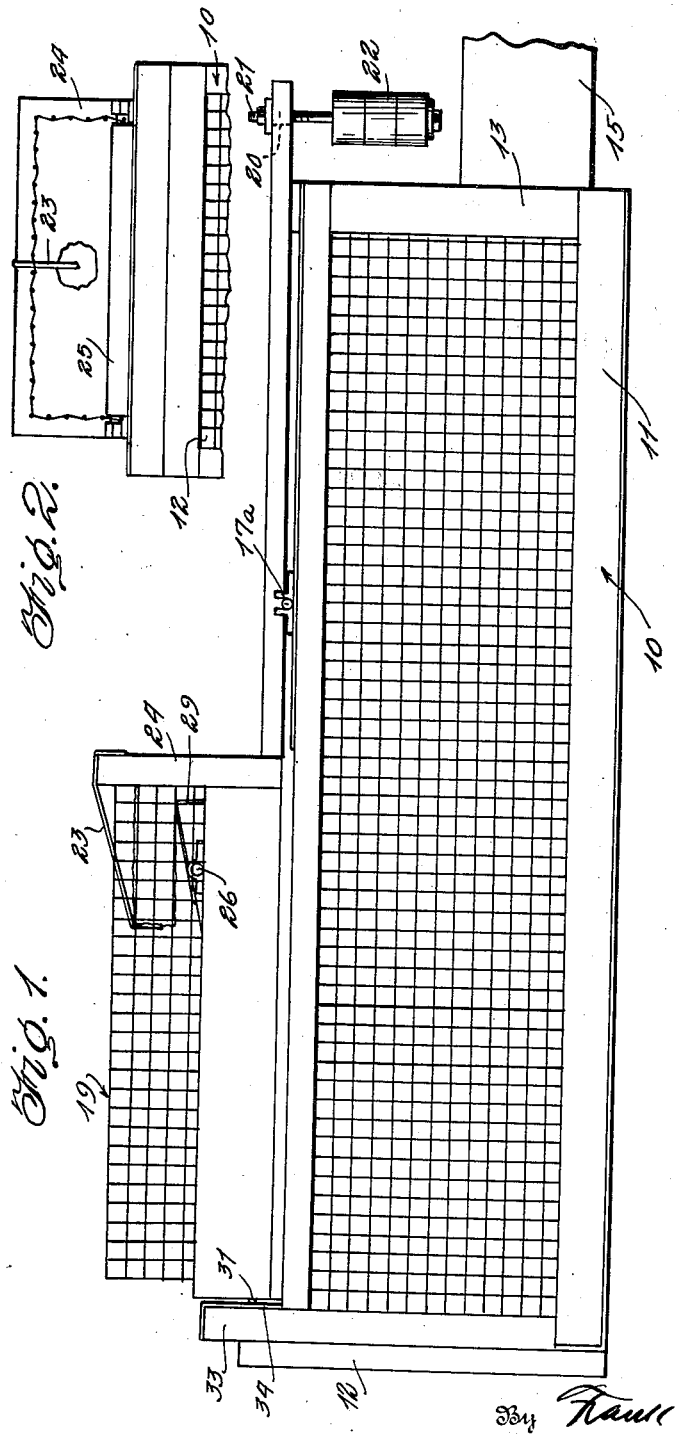
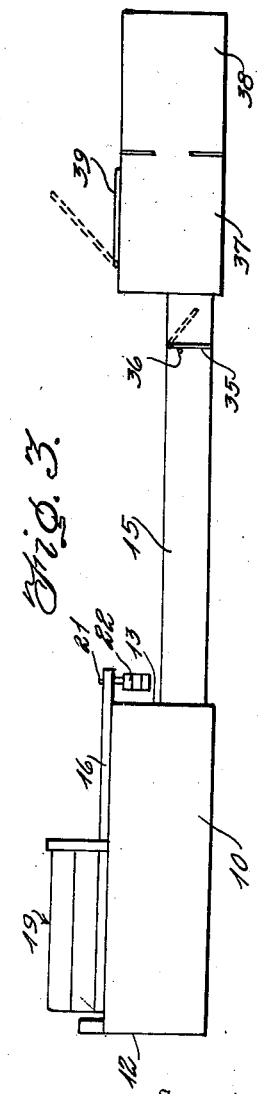
Inventor,
Otto Meswarb,
By Frank S. Appleman
          Attorney Oct. 15, 1940.  O. MESWARB  2,218,289
ANIMAL TRAP
Filed Jan. 22, 1940  2 Sheets-Sheet 2
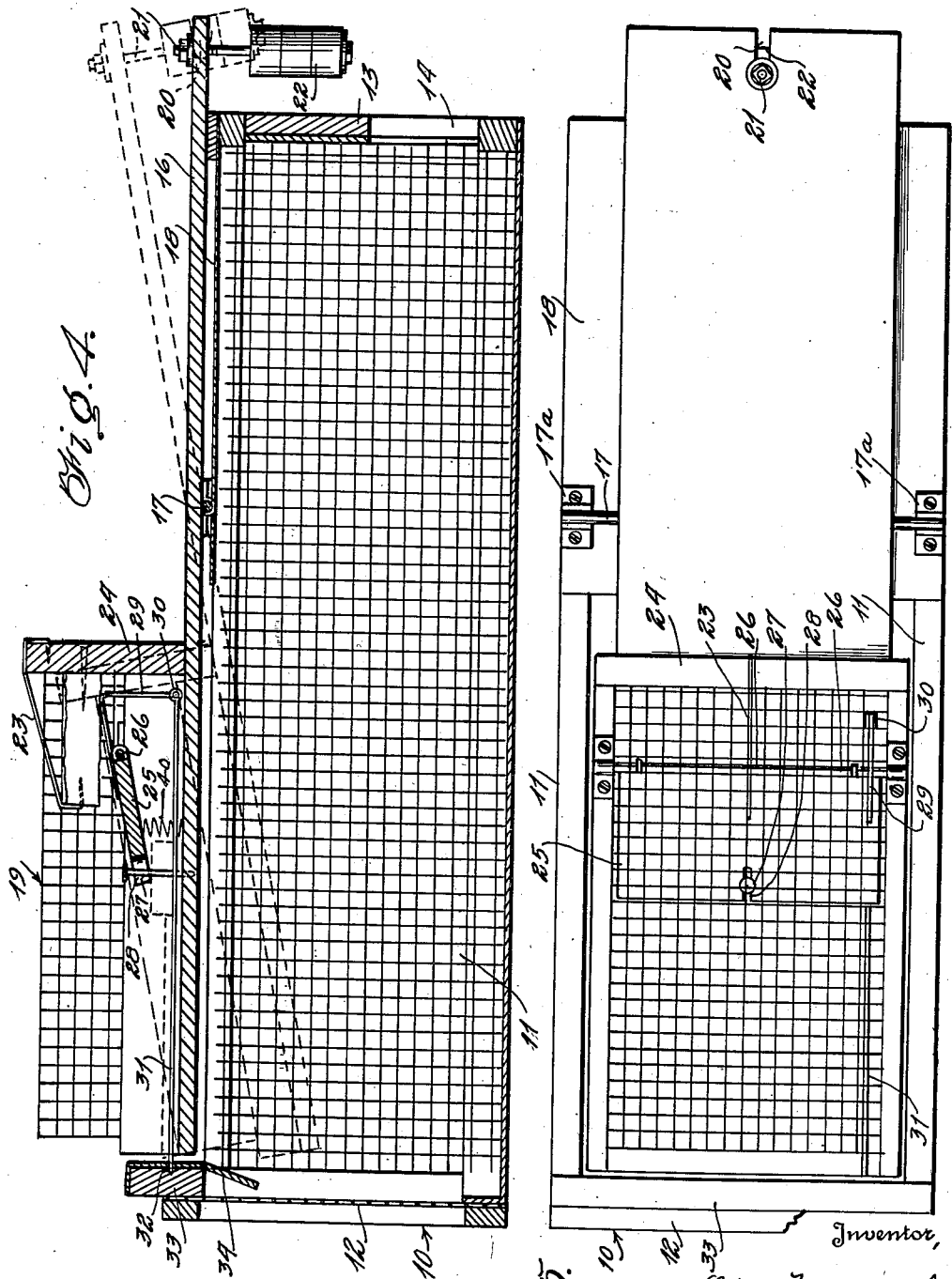

Patented Oct. 15, 1940

2,218,289

UNITED STATES PATENT OFFICE 2,218,289

ANIMAL TRAP

Otto Meswarb, Sumner, Iowa

Application January 22, 1940, Serial No. 315,123

1 Claim. (Cl. 43—70)

This invention relates to animal traps, and particularly to traps for catching rats, although obviously it is available for any trapping if the proportions are such as to hold the animal to be trapped.

It is an object of this invention to provide a trap which is held in certain position while the animal is entering the trap and in which the holding means is moved by the weight of the animal as it approaches the food or while he is eating; novel means being provided for retracting the retaining means to reset the trap after the animal has left a baiting compartment of the trap.

It is a further object of the invention to provide a treadle or platform oscillatably mounted, on which the animal must move to a position for eating the bait, and the arrangement is such that when released the trapping compartment moves downwardly so that when the animal attempts to escape in a direction opposite to that in which he approached the food, his weight will be increasingly effective to force the trapping compartment downwardly in the bin or cage into which he escapes from the trapping compartment; means being provided for restoring the trapping compartment to its operative position and retaining it in that position for a repetition of the operation.

It is a still further object of the invention to provide a cage or compartment in which the animal is deposited from the trapping compartment and which cage preferably has an opening in its rear end with which a tunnel communicates, through which the animal travels to compartment or to compartments where they may assemble externally of the trap until such time as they are to be destroyed or removed therefrom. The trap may, under certain conditions, be constructed without the tunnel and its accompanying parts, in which event the rear wall would be without the opening and the animals would be collected in the first mentioned cage until such time as they were destroyed or removed therefrom.

It is a still further object of the invention to provide a trap of the character indicated which will be comparatively inexpensive, as well as efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in side elevation of a trap embodying the invention;

Figure 2 illustrates a front end of a fragment of the trap;

Figure 3 illustrates a view in side elevation, diagrammatic in character;

Figure 4 illustrates a longitudinal sectional view of the trap; and

Figure 5 illustrates a plan view thereof.

In these drawings 10 denotes a rectangular cage which may be of any appropriate construction, although it is here shown as having wire mesh sides 11 and a front end 12, the rear end 13 being of any appropriate construction, but here shown as of a board-like structure, having the opening 14 with which the tunnel 15 communicates.

A platform 16 is oscillatably mounted on a trunnion 17 which, in this illustration, rests on open bearings 17a on the top 18 of the cage. The said top 18 does not extend over the entire length of the cage but is open in part to permit the movement therein of the trapping compartment, generally identified by the numeral 19. The rear end of the platform is slotted as at 20 to receive the stem 21 of the weight 22 which returns the platform to the position in which it is shown in full lines, Fig. 4, after it has been oscillated or moved by the animal to the dotted line position in said figure when it escapes from the trapping compartment.

A bait holding bracket or anchor 23 is attached to the rear end 24 of the trapping compartment, and a treadle or platform 25 is oscillatably mounted on a pivot or trunnion 26 so that when the animal steps on the treadle or platform it is depressed by his weight. The upward movement of this treadle or platform is limited by the stud or nail 27 anchored to the platform and the treadle has a slot 28 as a clearance so that it can move with respect to the stud. An arm 29 is secured to the said treadle and the said arm carries a pivot 30. The arm operates a latch or pin 31 connected to the pivot 30 and the latch or pin projects at the front end of the said trapping compartment and is lodged in a seat or recess 32 of the frame member 33 which is a stationary part of the cage. It is intended that the latch shall be withdrawn from its seat when the treadle 25 is moved downwardly under the weight of the animal, thus releasing the trapping compartment and permitting it to oscillate or move downwardly into the cage and from this trapping compartment the animal escapes into the cage. When his weight is removed from the trapping compartment, the platform is returned to its normal position under the influence of the weight 22. As the trapping compartment rises, the end of the latch engages the camming plate 34 and this retracts the said latch so that the trap is automatically reset when the end of the latch enters the seat 32 and a repetition of the operation may ensue without any manual resetting or attention.

The tunnel 15 has a gate 35 oscillatably mounted therein and it is intended to open only in one direction, as shown by dotted lines. It is prevented from moving in the opposite direction by a pin or other arresting device 36, and hence the animals can only escape through the tunnel in the direction of the compartments 37 and 38 in which they collect and in which they may be destroyed by connecting the exhaust pipe of an automobile to the compartments, a condition which will result in their being killed by carbon monoxide, although of course other means may be provided for disposing of the animals.

The compartments may have a door 39 or the like to permit the removal of the animals, but this of course is an immaterial detail which may be variously modified.

While the bearings 17a are shown as open bearings, other mountings may be provided for the trunnion, but if the bearings are open, the platform can be readily removed and if the cage is not provided with a tunnel, it will facilitate the removal of the animals from the cage as the platform can be raised for that purpose.

The treadle 25 is returned to its operative position after the animal has left it by a spring 40 which is also effective to reseat the latch.

I claim:

In an animal trap, a cage including a frame, an oscillatable platform, a trapping compartment thereon, the said trapping compartment moving downwardly into the cage for dislodging the animal therefrom into the cage, a bait holding member in the trapping compartment, a movable treadle in said trapping compartment, a latch for holding the trapping compartment in operative position, means for connecting the treadle and latch whereby movement of the treadle retracts the latch and releases the trapping compartment, means for returning the trapping compartment to its normal position, the said frame having a latch seat, a camming plate secured to the frame and depending into the cage in the path of travel of the end of the latch and operative to retract the latch during the last mentioned movement of the trapping compartment, a tunnel in communication with the cage, and animal holding compartments communicating with the tunnel.

OTTO MESWARB.